US007155412B2

(12) United States Patent
Brown et al.

(10) Patent No.: US 7,155,412 B2
(45) Date of Patent: Dec. 26, 2006

(54) BILLING FOR USE OF A TELEPHONY DEVICE

(75) Inventors: Michael Wayne Brown, Georgetown, TX (US); Joseph Herbert McIntyre, Austin, TX (US); Michael A. Paolini, Austin, TX (US); James Mark Weaver, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 10/022,611

(22) Filed: Dec. 17, 2001

(65) Prior Publication Data

US 2003/0115138 A1 Jun. 19, 2003

(51) Int. Cl.
*G09Q 40/00* (2006.01)

(52) U.S. Cl. .................. 705/40; 705/35; 705/44; 455/406

(58) Field of Classification Search .................. 705/40, 705/44, 35; 455/406
See application file for complete search history.

(56) References Cited

U.S. PATENT DOCUMENTS

| | | | |
|---|---|---|---|
| 5,148,474 A | 9/1992 | Haralambopoulos et al. | |
| 5,206,899 A | 4/1993 | Gupta et al. | 379/120 |
| 5,381,467 A | 1/1995 | Rosinski et al. | 379/121.01 |
| 5,499,288 A | 3/1996 | Hunt et al. | 379/88 |
| 5,568,541 A | 10/1996 | Greene | |
| 5,602,907 A | 2/1997 | Hata et al. | 379/114.22 |
| 5,673,404 A | 9/1997 | Cousins et al. | 395/347 |
| 5,754,663 A | 5/1998 | Goldfarb | 381/82 |
| 5,790,637 A | 8/1998 | Johnson et al. | 379/67 |
| 5,805,680 A | 9/1998 | Penzias | 379/118 |
| 5,822,411 A | 10/1998 | Swale et al. | 379/114.22 |
| 5,859,900 A * | 1/1999 | Bauer et al. | 379/114.21 |
| 5,872,834 A | 2/1999 | Teitelbaum | 379/93.03 |
| 5,915,001 A | 6/1999 | Uppaluru | 379/88.22 |
| 5,937,044 A | 8/1999 | Kim | |
| 5,940,476 A | 8/1999 | Morganstein et al. | 379/88.02 |
| 5,943,405 A | 8/1999 | Morikawa et al. | 379/118 |
| 5,946,654 A | 8/1999 | Newman et al. | 704/246 |
| 5,978,450 A | 11/1999 | McAllister et al. | 379/88.02 |
| 6,038,305 A | 3/2000 | McAllister et al. | 379/207 |
| 6,047,051 A | 4/2000 | Ginzboorg et al. | 379/130 |
| 6,058,364 A | 5/2000 | Goldberg et al. | 704/252 |

(Continued)

FOREIGN PATENT DOCUMENTS

EP 0585004 A2 3/1994

(Continued)

OTHER PUBLICATIONS

WPAT Derwent 1994-067503.

(Continued)

*Primary Examiner*—Alain L. Bashore
(74) *Attorney, Agent, or Firm*—Mark S. Walker; Amy J. Pattillo (57) ABSTRACT

A method, system, and program for billing a caller for use of an origin device are provided. Usage, of at least one measurable element of a telephony device by an identified individual, is tracked, where the identified individual is distinct from an owner of the origin telephony device. A tariff for the tracked usage is transferred to an intermediary device. The intermediary device charges the tariff according to a billing plan for the identified individual, such that the owner is compensated for use of at least one measurable element of the owner's telephony device. Measurable elements may include the time the telephony device is in the identified individual's possession, the battery usage, and usage of the address book.

37 Claims, 6 Drawing Sheets

U.S. PATENT DOCUMENTS

| | | | | |
|---|---|---|---|---|
| 6,098,878 | A * | 8/2000 | Dent et al. | 235/380 |
| 6,101,242 | A | 8/2000 | McAllister et al. | 379/88.02 |
| 6,122,357 | A | 9/2000 | Farris et al. | 379/207 |
| 6,178,230 | B1 | 1/2001 | Borland | 379/67.1 |
| 6,195,419 | B1 | 2/2001 | Gilboy | 379/114.26 |
| 6,282,274 | B1 | 8/2001 | Jain et al. | 379/114.26 |
| 6,324,269 | B1 | 11/2001 | Malik | 379/114.23 |
| 6,327,346 | B1 | 12/2001 | Infosino | 379/88.02 |
| 6,330,315 | B1 | 12/2001 | Kapsales et al. | |
| 6,381,317 | B1 | 4/2002 | Bala et al. | 379/114.23 |
| 6,542,590 | B1 | 4/2003 | Player et al. | |
| 6,546,238 | B1 | 4/2003 | Nightingale et al. | 455/406 |
| 6,556,817 | B1 * | 4/2003 | Souissi et al. | 455/406 |
| 6,603,843 | B1 | 8/2003 | Hagemann | 379/111 |
| 6,639,977 | B1 * | 10/2003 | Swope et al. | 379/114.21 |
| 6,826,173 | B1 | 11/2004 | Kung et al. | |
| 2002/0082991 | A1 * | 6/2002 | Friedman et al. | 705/40 |
| 2002/0099670 | A1 | 7/2002 | Jakobsson | |
| 2002/0123934 | A1 * | 9/2002 | Tanaka et al. | 705/20 |
| 2003/0108158 | A1 | 6/2003 | Brown et al. | 379/88.01 |
| 2003/0108159 | A1 | 6/2003 | Brown et al. | 379/88.01 |
| 2003/0108160 | A1 | 6/2003 | Brown et al. | 379/88.01 |
| 2003/0108161 | A1 | 6/2003 | Brown et al. | 379/88.01 |
| 2003/0108163 | A1 | 6/2003 | Brown et al. | 379/88.01 |
| 2003/0112935 | A1 | 6/2003 | Brown et al. | 379/114.21 |
| 2003/0112936 | A1 | 6/2003 | Brown et al. | 379/121.02 |
| 2003/0114139 | A1 | 6/2003 | Brown et al. | 455/408 |
| 2003/0114142 | A1 | 6/2003 | Brown et al. | 455/408 |
| 2003/0115070 | A1 | 6/2003 | Brown et al. | 705/26 |

FOREIGN PATENT DOCUMENTS

| | | |
|---|---|---|
| EP | 0676882 A2 | 10/1995 |
| JP | 8139797 A | 5/1996 |
| JP | 10294784 A | 11/1998 |

OTHER PUBLICATIONS

WPAT Derwent 1995-346415.
WPAT Derwent 1996-315499.
WPAT Derwent 1999-031530.
"VOip Gateways: Bigger and Better", Business Communications Review, vol. 31, No. 9, vol. 56(7) (Sep. 2001).

* cited by examiner

BILLING FOR USE OF A TELEPHONY DEVICE

CROSS-REFERENCE TO RELATED APPLICATIONS

The present application is related to the following co-pending applications:
(1) U.S. patent application Ser. No. 10/015,381;
(2) U.S. patent application Ser. No. 10/015,281;
(3) U.S. patent application Ser. No. 10/015,265;
(4) U.S. patent application Ser. No. 10/015,267;
(5) U.S. patent application Ser. No. 10/015,282;
(6) U.S. patent application Ser. No. 10/015,280;
(7) U.S. patent application Ser. No. 10/023,408;
(8) U.S. patent application Ser. No. 10/023,407;
(9) U.S. patent application Ser. No. 10/023,404;
(10) U.S. patent application Ser. No. 10/023,406; and
(11) U.S. patent application Ser. No. 10/022,159.

BACKGROUND OF THE INVENTION

1. Technical Field

The present invention relates in general to telecommunications and, in particular, to voice identification. Still more particularly, the present invention relates to billing a caller for use of an origin device.

2. Description of the Related Art

Telephone service has created communication channels worldwide, and those channels continue to expand with the advent of cellular and other wireless services. A person can simply take a telephone off-hook and dial a destination number or press a send button and be connected to a telephone line around the world.

Today, the public switching telephone network (PSTN), wireless networks, and private networks telephone services are based on the identification of the wireless telephone or wireline that a calling party uses. Services are personalized according to wireless telephone or wireline telephone number, where services associated with one telephone number are not accessible for another telephone number assigned to the same subscriber. For example, there is typically a first set of service features and billing options assigned to a home line number, a second set of service features and billing options assigned to an office line number, and a third set of service features and billing options assigned to a cellular telephone number. The networks process calls to and from each of these different subscriber telephones based on a separate telephone number.

One problem with personalizing services according to a line number is that a subscriber to the line number is billed for all services provided to the line number, regardless of who is actually utilizing the line number. In particular, where a wireline based telephone device associated with a particular line number is utilized by multiple people, the line subscriber will incur additional charges for those services that other callers utilize that are billed on a per use basis, such as long distance service.

While wireline service is typically billed at a flat rate for each month of use, use of a wireless service is typically billed at a rate for the actual use of a wireless service telephone device in placing and receiving calls. Charges associated with the actual use of a wireless service telephone device may include a charge per minute of use. In addition, use of a wireless device typically requires use of a battery resource.

Where a line subscriber loans a wireless service telephone device to a friend to place or receive a call, the line subscriber is also giving the cost of minutes used by the friend. Even though the friend may have a wireless service subscription, that subscription is not transferrable to the wireless telephone device. Further, the subscriber is giving the battery power resource utilized to power the telephone device and the time that subscriber could be using the wireless service telephone device.

Therefore, in view of the foregoing, it would be advantageous to provide a method, system, and program for billing for use of a wireless service telephone device according to the billing plan of the caller actually utilizing the wireless service telephone device. In addition, it would be advantageous to provide a method, system, and program for charging callers, other than the device owner, for use of a telephone device, including a charge for loss of time available for use of the telephone device, loss of battery power, and other usage that may be charged as a tariff for use of another's telephone device.

SUMMARY OF THE INVENTION

In view of the foregoing, it is therefore an object of the present invention to provide an improved telecommunications system.

It is another object of the present invention to provide a method, system and program for improved voice identification.

It is yet another object of the present invention to provide a method, system and program for billing a caller for use of an origin device.

According to one aspect of the present invention, usage, of at least one measurable element of a telephony device by an identified individual, is tracked, where the identified individual is distinct from an owner of the origin telephony device. A tariff for the tracked usage is transferred to an intermediary device. The intermediary device charges the tariff according to a billing plan for the identified individual, such that the owner is compensated for use of at least one measurable element of the owner's telephony device. Measurable elements may include the time the telephony device is in the identified individual's possession, the battery usage, and usage of the address book.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

A method, system, and program for billing an identifiable individual for use of a telephony device are provided. For purposes of the present invention, a telephony device may include a wireline or wireless service based telephony device. In addition, a telephony device may include a call center, a private network system, a private switching system, and other systems that are enabled to originate or receive a call request.

In addition, for purposes of the present invention, an identifiable individual may also own the telephony device utilized for a call request. However, according to an advantage of the present invention, where an identifiable individual is not the owner of the telephony device, the identifiable individual is charged a tariff for use of the telephony device. In particular, an identifiable individual may be charged the time utilized by the identifiable individual, the cost of the telephony device not being available for use by the telephony device owner, use of battery power, and other measurable usage elements. Owning a telephony device may include owning the device itself and/or subscribing to the line number service provided to the device.

For purposes of the present invention, an identifiable individual may include either a caller or a callee. A telephony device may include both origin telephony devices and destination telephony devices. For purposes of simplification, the present invention is described with a focus on a caller utilizing an origin telephony device, however the invention is also applicable for a callee utilizing a destination telephony device, a caller using a destination telephony device, and a callee using an origin telephony device.

First, an identity of a caller utilizing the origin device is authenticated. Caller identity authentication may be initiated by the origin device originating the call, the intermediary device processing the call, or the destination device receiving the call. Each of the devices may access a third party or external server to perform the caller identity authentication. Performance of caller identity authentication has different advantages depending on the device initiating the caller identity authentication.

While in the present invention, authentication of a caller identity is described with emphasis placed on voice authentication, other methods of caller identity authentication may also be performed. Voice samples utilized for voice authentication are just one of multiple types of biometric sampling. For example, a caller may locally provide an eye scan, a fingerprint, and other biophysical identifiers that are transmitted within or outside the trusted network to autnenticate the identity of the caller. Alternatively, keypad entries, such as a pin code, account number, password, or other secure transaction key may be entered by a caller and utilized to authenticate the identity of the caller.

Next, a caller profile is accessed according to the authenticated identity of the caller utilizing the origin device. The caller profile includes a billing plan and services requested by the caller. The caller profile may be accessed from a service provider within the trusted telephone network and/or from external servers functioning outside the trusted telephone network, where the caller has selected to disclose caller profile information at those external servers.

The call is then processed according to the services and billing plan of the caller. Advantageously, by specifying the billing for use of an origin device according to the caller utilizing the device, rather than the device owner, the device owner is not billed for telephone services provided to another.

According to an advantage of the present invention, the origin device may track usage of measurable elements of the origin device. The tracked usage of measurable elements is then utilized to charge the caller a tariff for use of the origin device. Therefore, in addition to billing the caller for the telephone services provided by a service provider, the caller is billed for the measurable usage of elements of the origin device. For example, a line subscriber may designate a tariff for possession of a wireless telephony device by nonowners. Therefore, the caller billing plan is charged for the wireless telephone service, but the caller is also charged a tariff for possession of the wireless telephony device itself, such that the owner is compensated for time that the caller placed the wireless telephony device out of use by the owner.

In particular, while use of the origin device may be tracked concurrently with a call originated from the origin device, use of the origin device independent of a call may also be tracked. For example, where a caller utilizes an origin device to access an address book, the usage of the address book and the battery usage while accessing the address book may be tracked and charged to the caller as a tariff.

For purposes of the present invention, a caller preferably subscribes to a telephone service from at least one service provider. That service may be linked to a particular line number, but preferably follows the caller to whatever telephone device the caller chooses to utilize. The service may include a billing plan that provides for services in addition to basic telephone service, at a flat rate. In addition, the billing plan may provide for other services, in addition to basic telephone service, that are billable according to use, such as long distance service. Further, the billing plan may provide for transferring micropayments or other methods of paying tariffs charged for use of origin devices.

For purposes of the present invention, telephony devices are termed origin devices when utilized for origination of a call to an intermediary device and are termed destination devices when utilized for receipt of a call from an intermediary device. Subscribers are termed callers when originating a call and are termed callees when receiving a call.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Figure 1:
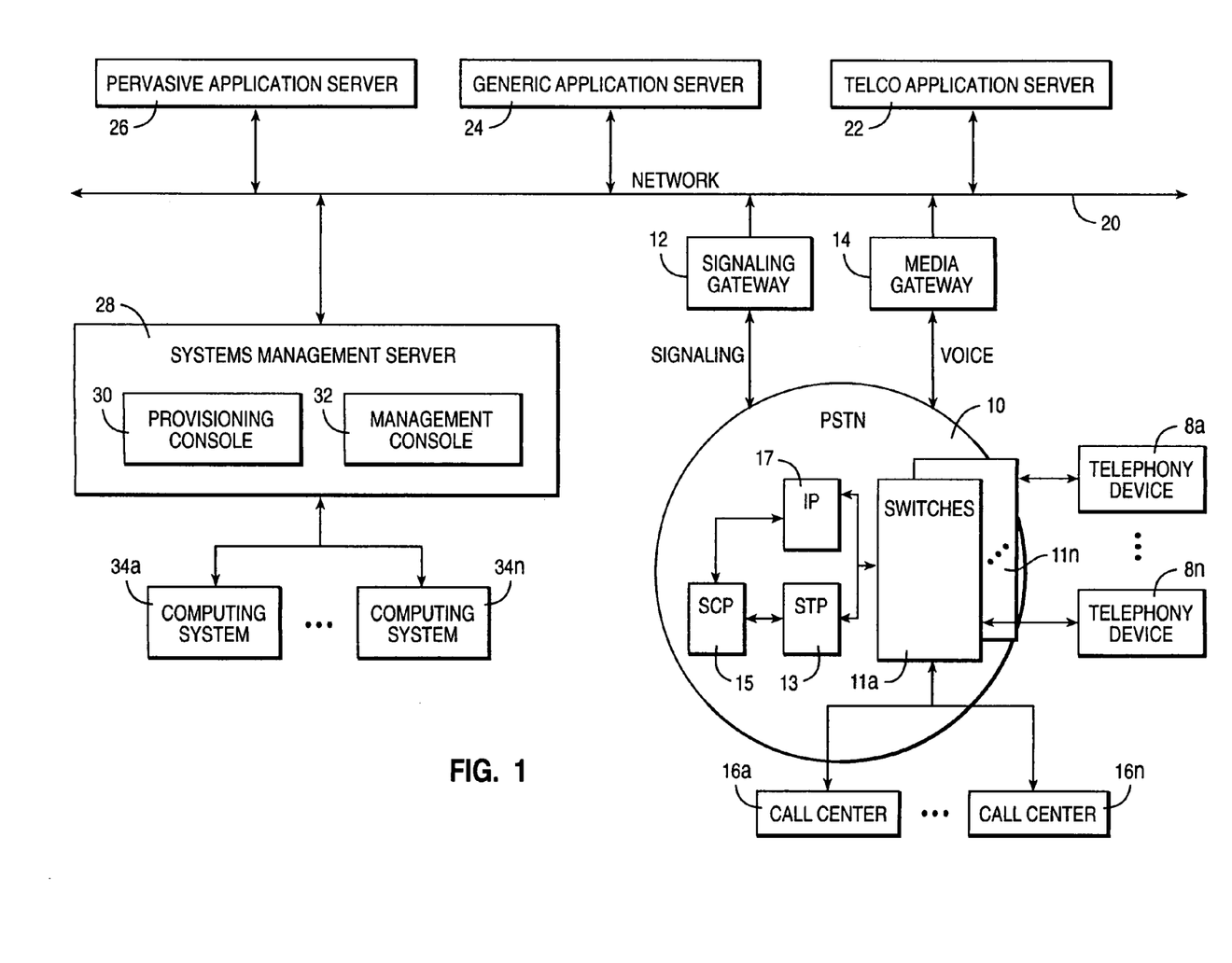
FIG. 1 depicts a block diagram of a network environment in which the present invention may be implemented.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

General Network Environment

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider's telephone network is considered trusted movement within a trusted network because the call remains within the company's telephone network infrastructure. However, calls may be transferred from one service provider's telephone network to another service provider's telephone network in generally trusted movement. Generally, service providers are in competition with one another and therefore there is general trust in transferring a call, but not trust in sharing of subscriber information beyond a subscriber number and name from one service provider to the next without security features or other arrangements.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider's data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via a network 20 is untrusted and therefore may require verification and additional security. Network 20 may be preferably considered an external network.

In the present invention, network 20 may comprise a private network, an Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. PSTN 10 preferably brokers the connection between the telephony device and telco application server 22. Such services may also be provided to calls within PSTN 10, however placing such services at a third party such as telco application server 22, is advantageous because adding services and information to PSTN 10 is time consuming and costly when compared with the time and cost of adding the services through telco application server 22.

In accord with an advantage of the present invention, as will be further described, the identity of both the caller and the callee may be authenticated by one of telephony devices 8a–8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a–34n.

The subscriber profile may be accessed at systems management server 28 by other external servers and PSTN 10 via network 20. In addition, a local copy of a subscriber profile updated in systems management server 28 may be stored within a particular service provider's data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other security devices. In addition, a subscriber may designate billing preferences, shopping preferences, buddy list preferences, and other preferences that enable specialized service to the subscriber when the subscriber's identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

Identity Authentication and Call Control

Looking into PSTN 10, a telephone network typically includes multiple switches, such as central office switches 11*a*–11*n*, that originate, terminate, or tandem calls. Central office switches 11*a*–11*n* utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11*a*–11*n* query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP provides record of the privacy service to initiate an announcement to a caller to identify themself to the subscriber with the privacy service who is being called. According to an advantage of the invention, authentication of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11*a*–11*n* may also send voice and signaling messages to intelligent peripherals (IP) 17 via voice trunks and signaling channels. IP 17 provides enhanced announcements, enhanced digit collection, and enhanced speech recognition capabilities.

According to an advantage of the present invention, the identity of a caller is authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a subscriber may be authenticated according to passwords, eye scans, encryption, and other security devices.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition, where IP 17 authenticates the identity of a callee (e.g. the subscriber receiving a call), a reverse VID (RVID) including the callee identity is transferred as a signal for identifying the callee.

Alternatively, to perform subscriber authentication of audio signals received from callers, PSTN 10 may broker a caller identity authentication service from telco application server 22. In particular, a signaling channel is opened between central office switches 11*a*–11*n* and telco application server 22 via signaling gateway 12. In addition, a voice channel is opened between central office switches 11*a*–11*n* and telco application server 22 via media gateway 14.

Because telco application server 22 is located outside of the trusted network, there may be a time delay associated with establishing a connection to telco application server 22 and authenticating the identity of a caller that is longer than a time delay present where a caller identity is authenticated by IP 17.

In addition, because telco application server 22 is located outside of the trusted network, it is advantageous to establish a level of security for transactions between telco application server 22 and central office switches 11*a*–11*n*, wherein the level of security is suitable for untrusted communications. A level of security may be implemented by by utilizing security based protocols, such as the secure socket layer, and by applying ordinary encryption. In particular, the level of security preferably protects the communication channel between telco application server and PSTN 10 and authenticates the identity of the server from which a caller identity authentication service is accessed. Therefore an additional feature of signaling gateway 12 and media gateway 14 is security verification.

Advantageously, VIDs indicate through text, voice, or video the identity of a caller. For example, a caller's name may be transferred as the identity of a caller. Alternatively, a video clip stored with the subscriber template may be transferred as the identity of a caller. Additionally, VIDs may indicate the identity of the device utilized by a caller to provide context for a call. Further, VIDs may indicate which system or systems have authenticated the caller identity.

After a VID and/or RVID are determined by IP 17, IP 17 and SCP 15 may communicate to designate which services are available according to VID and RVID. Advantageously, by designating services according to a VID and/or RVID, subscribers are provided with services and billed for those services independent of the devices utilized by subscribers.

In particular, a 1129 protocol or other protocol may be utilized to enable signal communications between IP 17 and SCPs 15.

In addition, as previously described, caller authentication to determine VIDs and RVIDs may be performed by an external system, such as telco application server 22. The VID or RVID returned from telco application server 22 may be transferred from central office switches 11a–11n to SCP 15 in order to access a subscriber profile associated with the VID or RVID. Alternatively, the VID or RVID may first transfer to IP 17, where additional verification of the caller identity is performed. For example, IP 17 may control distribution of the VID to the caller, where the caller is prompted to enter a password or additional information. IP 17 may then initiate loading the caller profile into central office switches 11a–11n if the additional caller input is verifiable for the VID.

An origin telephony device or destination telephony device may also determine a VID and/or RVID for the caller and/or callee of a call. In particular, telephony devices 8a–8n and call centers 16a–16n may function as origin and destination telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Telephony devices 8a–8n may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8a–8n.

In addition, telephony devices 8a–8n may each incorporate a display that provides a visual output of a VID or RVID. Alternatively, such a display may be provided in a separate device connected to the line in parallel to telephones 8a–8n. According to one advantage of the present invention, the identity of the actual caller or actual callee are output to a display in association with a call. In addition, other context information about the caller including, but not limited to, the device from which the call originates or is answered, ratings for a caller or callee, and other context information may be output to a display in association with a call.

Telephony devices 8a–8n are communicatively connected to PSTN 10 via wireline, wireless, ISDN, and other communication links. Preferably, connections to telephony devices 8a–8n provide digital transport for two-way voice grade type telephone communications and a channel transporting signaling data messages in both directions between telephony devices 8a–8n and PSTN 10.

In addition to telephony devices 8a–8n, advanced telephone systems, such as call centers 16a–16n, may be communicatively connected to PSTN 10 via wireline, wireless, ISDN and other communication links. Call centers 16a–16n may include PBX systems, hold queue systems, private network systems, and other systems that are implemented to handle distribution of calls to multiple representatives or agents.

Returning to central office switches 11a–11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a–11n. The assigned telephone number includes the area code (NPA) and exchange code (NXX) for the serving central office and four unique digits (XXXX).

Central office switches 11a–11n utilize office equipment (OE) numbers to identify specific equipment, such as physical links or circuit connections. For example, a subscriber's line might terminate on a pair of terminals on the main distribution frame of one of central office switches 11a–11n. The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party's station or line. The switch terminating a call to a destination will also utilize profile information relating to the destination, for example to forward the call if appropriate, to apply distinctive ringing, etc.

In the present invention, once a VID for a caller is received at one of central office switches 11a–11n, a profile for the caller is requested from SCP 15 or an external server accessible via network 20. The returned caller profile is loaded into a call register of one of central office switches 11a–11n. In particular, depending on the service provider included in a caller profile, the call may be switched to one of central office switches 11a–11n that is associated with the service provider. The telephone service provided to the caller is then billed according to the caller billing plan.

In addition, in the present invention, telephony devices 8a–8n may be equipped to monitor usage of measurable elements of telephony devices 8a–8n. For example, telephony devices 8a–8n may monitor minutes of device usage, battery usage, and usage of other measurable elements. Alternatively, IP 17 or an external server accessible via network 20 may monitor usage of measurable elements of telephony devices 8a–8n.

For a particular call, one of telephony devices 8a–8n, or other elemetns monitoring usage, may transfer the monitored usage to one of central office switches 11a–11n, where the central office switch transfers the monitored usage according to the caller billing plan. Telephony devices 8a–8n may also calculate the caller tariff for the monitored usage. In particular, the monitored usage and caller tariff may be transferred to SCP 15 or another data storage system for storage in association with a caller VID. In another example, the monitored usage and caller tariff may be transferred to a caller billing service accessible via network 20 according to VID, where the caller billing service then charges the caller for the caller tariff and transfers a micropayment for the caller tariff via network 20 to SCP 15 for storage in the device owner profile.

As another alternative to dialed digits from the off-hook line terminal, a caller may utilize a voice calling function of a telephony device for indicating how the call should be routed. For example, a caller may say the name of a preferred callee. The device or IP 17 may determine a person within the caller's calling list that matfches the voiced name. The matching person's digits are then utilized to route the call.

VID Authentication Context

Figure 2:
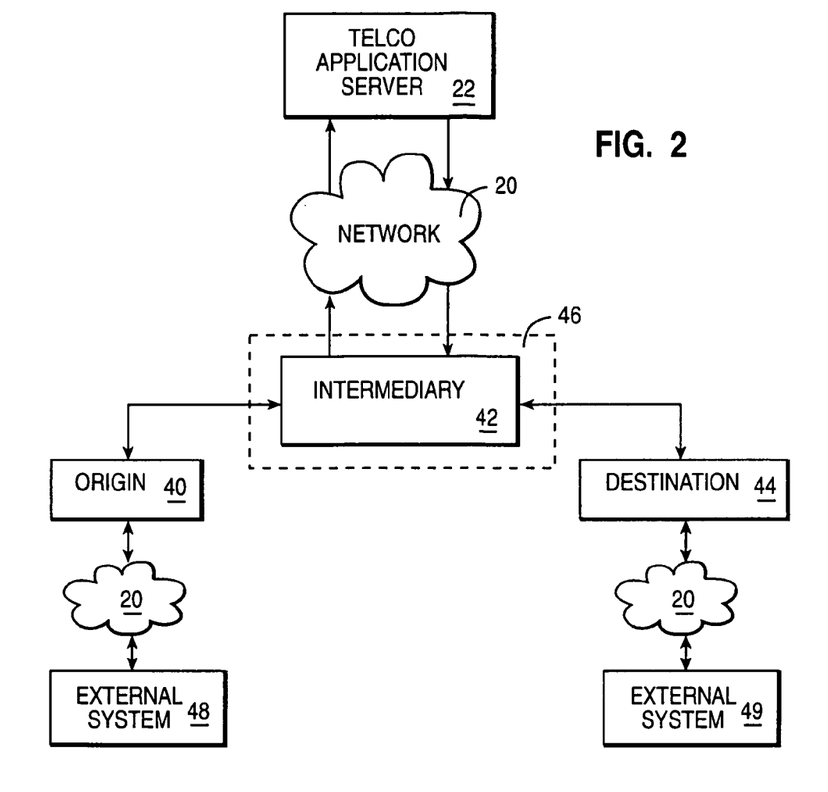
FIG. 2 illustrates a block diagram of the flow of a caller identity authentication in accordance with the method, system, and program of the present invention.

Referring now to FIG. 2, there is illustrated a block diagram of the flow of a caller identity authentication in accordance with the method, system, and program of the present invention.

Origin device 40 is utilized by a caller to initiate a call. The caller is prompted by the device performing caller authentication to provide a voice utterance. A VID for the caller is provided to intermediary device 42 from the device performing caller authentication. The VID is utilized to access a caller profile that includes service preferences and billing information. In addition, the VID is transmitted with the call to destination device 44 for identifying the caller.

In general, caller identity authentication is performed by receiving a voice utterance from a caller, analyzing the voice utterance for sound qualities and content, and attempting to match the sound qualities and content of a voice utterance to a voice template previously recorded for a caller, in order to authenticate the identity of the caller. If there is a match between the voice utterance and a voice template, then a VID is determined for the caller and utilized to authenticate the caller identity for retrieving a caller profile and billing the caller.

Caller identity authentication may be initiated by origin device 40. In particular, origin device 40 may include voice templates and a feature for performing the caller identity authentication. In addition, origin device 40 may access a third party server 48 via network 20, where third party server 48 may provide access to a database of voice templates and/or perform the caller identity authentication. Origin device 40 then transmits a VID determined for the caller to intermediary device 42 for use in specifying services and billing for a call from origin device 40. Origin device 40 may include a caller telephony device, a PBX, a call center, a private switching system, network servers, feature servers, and other systems which provide call origination. Third party server 48 may include a telco application server, a generic application server, a database management system server, and other systems that function outside trusted telephone network 46. In particular, intermediary device 42 may facilitate communication between origin device 40 and network 20.

In addition, caller identity authentication may be initiated by intermediary device 42. Intermediary device 42 may include database systems that store voice templates and an IP for performing caller identity authentication. In addition, intermediary device 42 may access telco application server 22 outside of trusted telephone network 46 via network 20, where telco application server 22 provides a caller authentication service and/or provides access to a database of voice templates. Intermediary device 42 may include a PSTN switching network or networks. However, intermediary device 42 may also include a PBX, a call center, or other private switching system. Further, intermediary device 42 may include network servers, Websphere® (Websphere® is a registered trademark of International Business Machines Corporation) servers, and other systems which provide call processing.

Further, caller identity authentication may be initiated by destination device 44. Destination device 44 may include voice templates and a feature for performing the caller identity authentication. In addition, destination device 44 may access a third party server 49 via network 20, where third party server 49 may provide access to a database of voice templates and/or perform the caller identity authentication. Destination device 44 will prompt a caller to provide a voice utterance at origin device 40, where intermediary device 42 facilitates communications between origin device 40 and destination device 44. Destination device 44 then determines and transmits a VID for the caller to intermediary device 42 for use in specifying services and billing for a call from origin device 40. Destination device 44 may include a callee telephony device, a PBX, a call center, a private switching system, network servers, feature servers, and other systems which provide call receipt. Third party server 48 may include a telco application server, a generic application server, a database management system server, and other systems that function outside trusted telephone network 46. In particular, intermediary device 42 may also facilitate communication between destination device 44 and network 20.

In the present invention, a VID preferably authenticates the identity of a caller. However, it is advantageous that the VID also include other information that provide a context for a call. For example, the GPS location or time zone of the caller location, the device from which the call is placed, the subject matter of the call, and whether the caller is calling on behalf of another, may be included in a VID. Further, the identity of the device that performed the identity authentication may be included in a VID.

Figure 3:
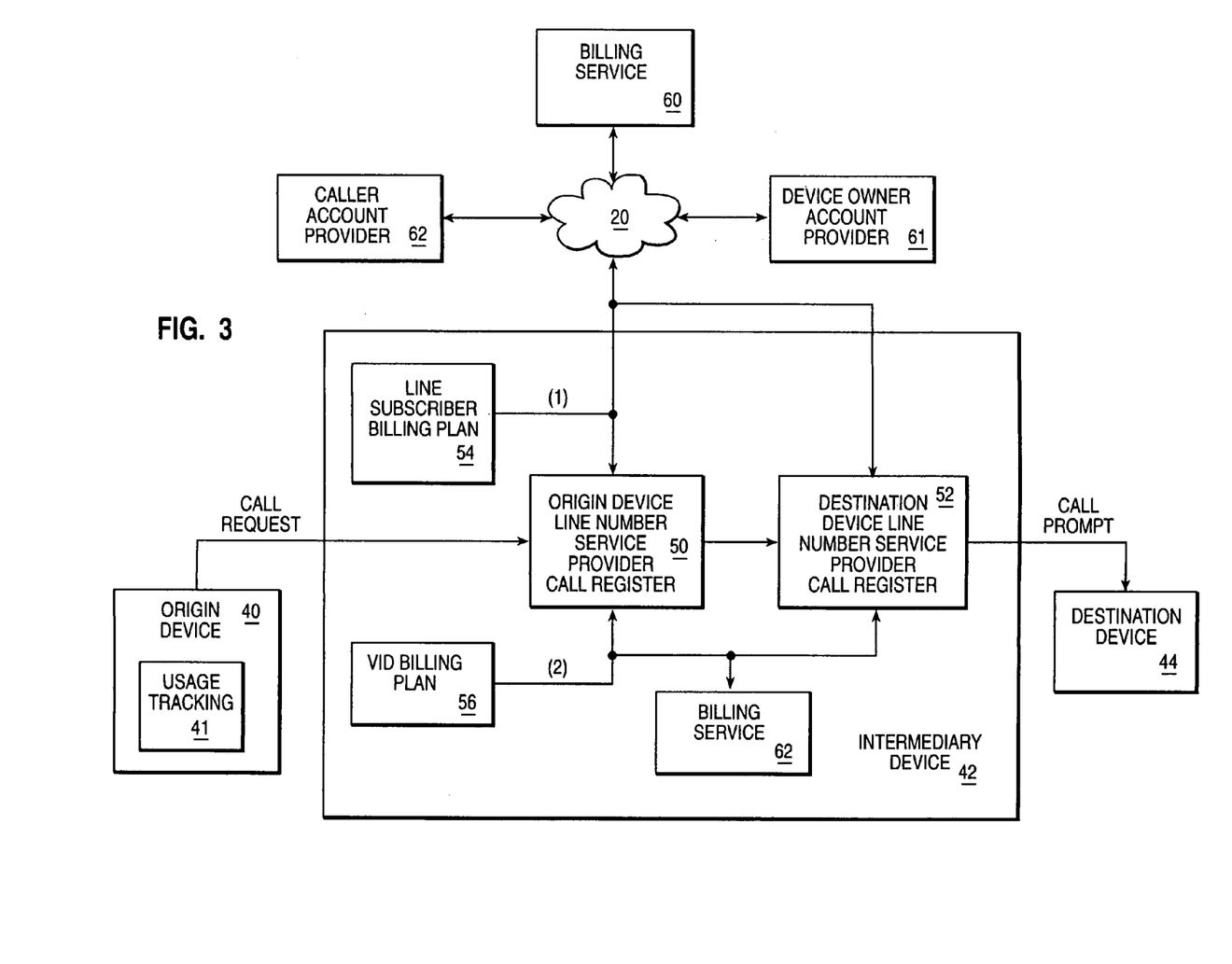
FIG. 3 depicts a block diagram of the flow of billing plans in accordance with the method, system, and program of the present invention.

A VID may be transferred in multiple protocols, including, but not limited to, Interface Definition Language (IDL). A VID may include a range of information, where each type of information may be tagged or identified in some other manner. For example, the following tagged VID may be transmitted to represent an authenticated identity of a caller:

[name] Jon Smith
[device] Jane Doe's cell phone
[service provider] Jon's wireless service provider G
[account provider] Credit account provider D, for device usage charges
[location] Central Time zone
[subject] Project A
[authenticated by] Jane Doe's cell phone, service provider G Caller Billing Context With reference now to FIG. 3, there is depicted a block diagram of the flow of a billing plan in accordance with the method, system, and program of the present invention. As illustrated, origin device 40 transfers a call request to intermediary device 42. The call request may be an off-hook condition for a wireline device and a network service connection request for a wireless device.

Initially, intermediary device 42 will respond to a call request by establishing a call register 50 for the call. Next, intermediary device 42 will respond by accessing the profile for the subscriber line associated with origin device 40. In the example, the profile includes line subscriber billing plan 54 that is accessed and loaded into call register 50. Line subscriber billing plan 54 may be accessed from a database within intermediary device 42 or by accessing a database outside trusted telephone network 46.

However, once a VID is determined for the call, intermediary device 42 will respond by accessing the profile for the VID. In the example, the VID profile includes a VID billing plan 56 that is accessed and loaded into call register 50. VID billing plan 56 may replace or supplement line subscriber billing plan 56 within call register 50. The call is then processed according to the billing plans available in call register 50.

VID billing plan 56 may be accessed from a VID based caller profile stored within a database accessible within trusted telephone network 46. In addition, VID billing plan 56 may be accessed from servers external to trusted telephone network 46. In particular, a caller may choose to disclose billing information at multiple locations external to trusted telephone network 46. In addition, a caller may choose to change billing information at systems management server 28 and other servers external to trusted telephone network 46. For example, a caller may access management console 32 within systems management server 28 to update service and billing preferences according to VID. Intermediary device 42 may then access systems management server 28 to obtain billing information according to VID.

The VID based caller profile preferably includes a billing plan that indicates at least one service provider for the caller and rates provided to the caller by the service provider. The service provider preferably tracks usage of telephone services by the caller in order to charge the caller for use of services beyond that which is provided in a calling plan.

In addition, a billing plan may include account provider selections, such as caller account provider 62. Caller account provider 62 may be charged for telephone services and telephone usage. In particular, account providers preferably manage accounts according to VIDS, such that charges may be made to an account without requiring the caller to provide account information to the billing party.

Next, a service provider for the destination line number indicated by a caller is determined by accessing a directory. The call is then switched to a destination device line number service provider call register 52, that terminates the call to destination device 44. As referenced above, the callee identified using destination device 44 may also be charged for use of measurable elements of destination device 44, where an RVID profile indicating a billing plan for the callee is loaded into call register 52. Further, a callee may charge a caller a tariff for the call, where the tariff reflects the use of destination device 44.

According to an advantage of the present invention, origin device 40 includes a usage tracking device 41. Usage tracking device 41 preferably tracks usage of measurable elements of origin device 40. For example, the time that origin device 40 is in possession of the caller, the battery power utilized, the address book accesses, and usage of other measurable elements of origin device 40 are tracked by usage tracking device 41. Alternatively, an IP or a service accessible outside trusted telephone network 46 may perform usage tracking.

Usage tracking device 41 reports usage of origin device 40 to intermediary device 42, where intermediary device 42 routes the usage information to a billing service. In addition, usage tracking device 41 may calculate a tariff associated with the usage, such that the tariff is displayed to the caller while the call is in progress. Usage tracking device 41 preferably transfers the tariff calculation to intermediary device 42 for charging a caller billing plan.

In response to receiving a tariff charge for a caller at call register 50, a billing service 62 may be triggered. A billing service 62 may reside within intermediary device 42 in association with a service provider. Alternatively, a billing service 60 may reside outside trusted telephone network 46, accessible via network 20.

A billing service preferably receives billing requests and facilitates payment of those billing requests between parties. For example, the billing service may facilitate payment for usage of a telephony device by a caller from caller account provider 62 to a device owner account provider 61. In addition, the billing service may facilitate payment for usage of a telephony device by a caller from caller account provider 62 in the form of an electronic micropayment transmitted to origin device 40. The billing service may facilitate payments between other entities accessible via network 20 or within trusted telephone network 46.

Figure 4:
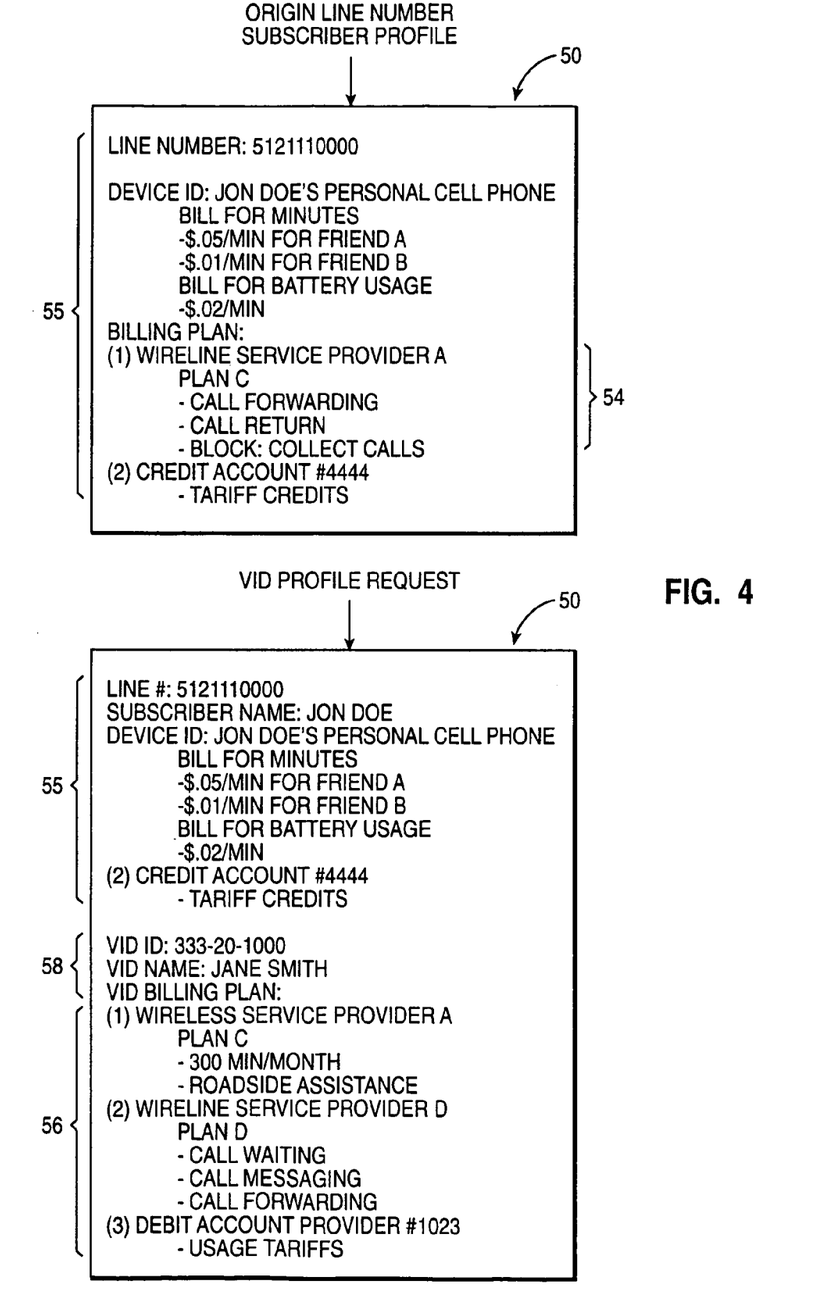
FIG. 4 illustrates an illustrative representation of the information within billing plans in accordance with the method, system, and program of the present invention.

Referring now to FIG. 4, there is an illustrative representation of the information within billing plans in accordance with the method, system, and program of the present invention.

In the example, in response to an origin line subscriber profile request, an origin line subscriber profile 55 is returned and stored within call register 50. In the example, origin line subscriber profile 55 indicates the line number, the name of the subscriber assigned to a line number, services requested for the origin line number, services blocked for the line number, and origin line subscriber billing plan 54. In addition, origin line subscriber profile 55 indicates an identifier for the device owned and the tariffs that will be billed by the device.

Origin line subscriber billing plan 54 may include information including, but not limited to, selected service providers and other account providers. A billing plan may include one service provider utilized for general wireline service and another service provider utilized for long distance service. Further, a billing plan may include other account providers, such as a credit account provider for receiving tariffs charged for use of an origin device and/or origin line number.

According to an advantage of the present invention, the billing information for a call in call register 50 may be supplemented or replaced by VID billing plan 56. In the example, the billing information for the VID replaces the billing information for the origin line subscriber, such that service provided to the caller may be billed to the caller, rather than the line subscriber.

In addition to billing information, VID and context information 58 may also be added to call register 50. In the example, VID and context information 58 includes a VID ID, a VID name, the line number, and an identifier for the device. In alternate embodiments, additional billing, VID, and call context information may be included in call register 50. In particular, where the origin line subscriber and the caller are the same person, it is still advantageous to supplement call register 50 with VID and context information 58.

According to one advantage of the present invention, the caller is billed for the telephone service provided to the origin device, rather than billing the line subscriber. According to another advantage of the present invention, each device owned by a line subscriber may have tariff charges associated therewith. In the example, tariff charges are associated with "Jon Doe's personal cell phone." These tariff charges may be further specified according to caller. For example, a device owner may apply one set of charges to a friend utilizing the device and another set of charges to a stranger utilizing the device. The device owner may indicate a list of VIDs for friends, where callers not in the list of VIDs are charged a higher tariff rate for usage. In addition, the tariff charges may adjust over time, where if a caller utilizes the device for less than five minutes, then a first set of tariff charges apply, but after five minutes, a second, higher set of tariff charges apply.

In particular, where a caller billing plan includes more than one account provider or service provider than may be charged a tariff for device usage, the context of the call may indicate which service provider should be charged. For example, one account provider may be selected for tariff charges associated with business calls and another account provider selected for tariff charges associated with personal calls, where the context of the call preferably includes whether the call is business or personal. Alternatively, the caller may be prompted to elect a provider for the tariff charges if one cannot be discerned from context.

Figure 5:
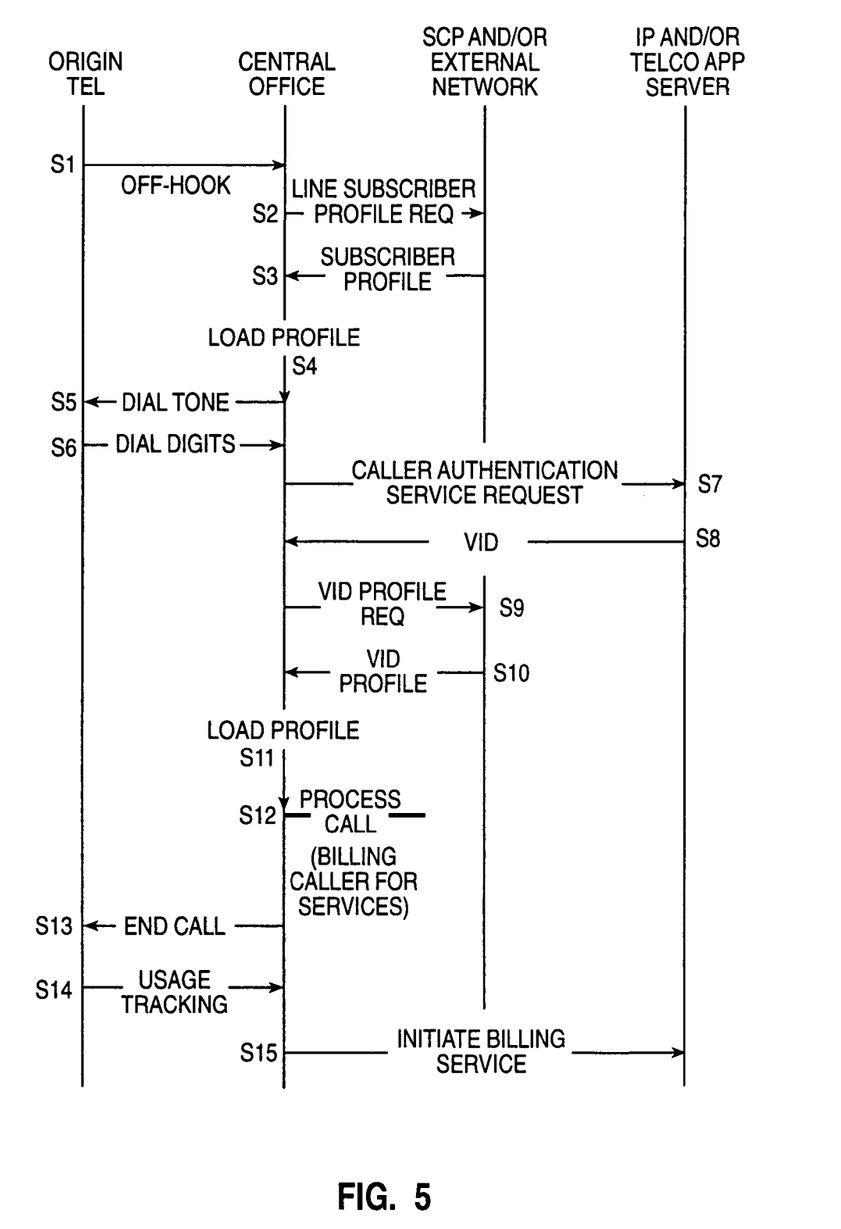
FIG. 5 depicts a flow diagram of a signal flow and processing of a call in accordance with the method, system, and program of the present invention.

With reference now to FIG. 5, there is depicted a flow diagram of a signal flow and processing of a call in accordance with the method, system, and program of the present invention. A standard telephone device is assumed for the "tel" origin device in the present example. However, a similar signal flow may be applied to other types of origin devices.

The caller lifts a handset creating an off-hook state in the origin device and a corresponding change in state of an off-hook signal to the origin central office (step S1). In response to detecting an off-hook state in the origin device, the origin central office establishes a register for the call and requests a line subscriber profile from the SCP and/or an external network server (step S2). A line subscriber profile including preferred services and a billing plan is returned to the origin central office (step S3). The central office loads the line subscriber profile into the call register (step S4) and extends a dial tone to the origin device (step S5).

The origin device then transmits dialed digits to the origin central office (step S6). A caller may utilize a keypad to enter a telephone number or utilize a voice dial feature if available. Dialed digits may be received at other points in the process and loaded into the call register until needed for processing the call.

Next, the origin central office extends a caller authentication service request to an IP or to the telco application server (step S7). The caller authentication server will prompt a caller to provide a voice utterance, match the voice utterance with a voice template and authenticate the caller identity as a VID which is returned to the central office (step S8). Alternatively, the origin device or destination device may perform caller authentication, where the VID is received from the origin device or destination device.

The origin central office updates the call register with the VID and extends a request for a VID based profile to the SCP and/or external network servers (step S9). The VID based profile is returned from locations where the caller has selected to make VID based information available (step S10). The origin central office then loads the VID based profile, including service preferences and billing information, into the call register (step S11). In particular, if a service provider indicated in a caller billing plan is different than the service provider providing the line, then the call may be transferred to the service provider indicated in the caller billing plan, where a new call register is created in the central office of the caller billing service provider.

Next, the central office processes the call (step S12). Processing the call entails providing the services requested by the current caller in the VID based profile. In addition, processing the call requires determining the destination service provider assigned to the dialed digits. The call may be transferred to the destination service provider, where the destination service provider establishes a call register to terminate the call to a destination device.

When the end of a call is detected by the origin central office, an end of call signal is transmitted to the origin device (step S13). An end of call signal may be initiated by the origin or destination central office if, for example, a pre-paid account for long distance service is depleted. Alternatively, an end of call signal may be initiated by the caller or callee hanging up.

In response to detecting an end of call signal, the origin telephone transmits usage tracking information and tariffs attached thereto to the origin central office (step S14). The origin central office initiates a billing service within the IP or the telco application server to manage payment of the tariff (step S15). In particular, the billing service may access a billing plan for the caller, debit a service provider or account provider according to the caller VID and provide a payment to the line subscriber. Alternatively, where usage of the origin telephone is not associated with use during a call, the origin telephone may determine the VID for the caller and contact the central office with the VID and usage transaction information at any point. The central office triggers the billing service to complete the tariff transaction.

Figure 6:
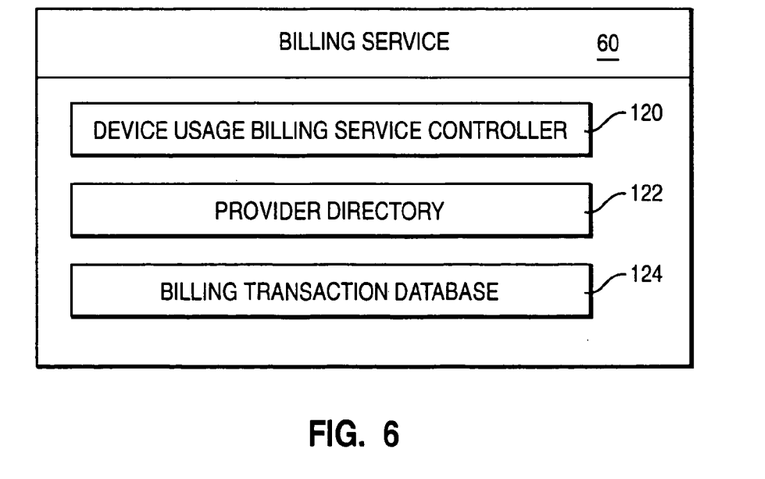
FIG. 6 illustrated a block diagram of a billing service in accordance with the method, system, and program of the present invention.

Referring now to FIG. 6, there is depicted a block diagram of a billing service in accordance with the method, system, and program of the present invention. As illustrated, billing service includes a device usage billing services controller 120. Controller 120 preferably monitors device usage, receives requests for device usage tariffs according to VID or RVID, facilitates payments for device usage tariffs and records tariff usage billing.

A provider directory 122 preferably includes network addresses of account and service providers to enable controller 120 to facilitate billing to account and service providers. In addition, provider directory 122 may include ratings for account and service providers according to reliability in previous financial transactions.

A billing transaction database 124 preferably stores records device usage tariff billing transactions facilitated by controller 120. In particular, records may be stored according to VID or RVID for reference in future transactions.

Figure 7:
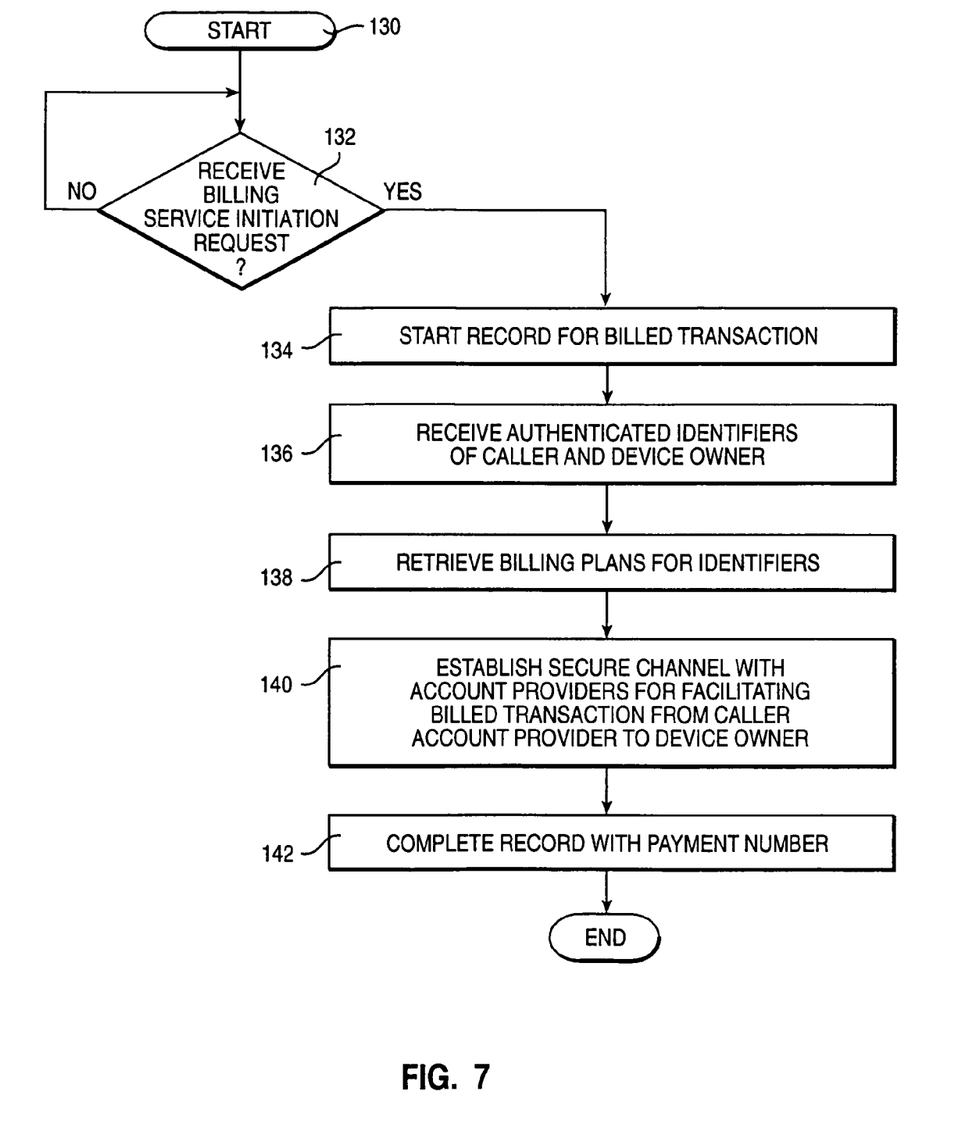
FIG. 7 depicts a high level logic flowchart of a processing and program for controlling a billing service in accordance with the present invention.

With reference now to FIG. 7, there is illustrated a high level logic flowchart of a process and program for controlling a billing service according to the present invention. As depicted, the process starts at block 130 and thereafter proceeds to block 132.

Block 132 illustrates a determination as to whether a billing service initiation request is received. The billing service may be initiated by a setting in a caller profile, a setting in a line subscriber profile, a request automatically initiated by a device, or by other inputs. If an initiation request is received, then the process passes to block 134.

Block 134 depicts starting a record for the billed transaction. Starting a record preferably includes recording the tariff amount and entity initiating the request. Next, block 136 illustrates receiving the authenticated identifiers of the caller and device owner. In particular, the authenticated identifiers may be filtered according to provide only that information needed by the billing service for processing the transaction.

Next, block 138 illustrates retrieving the billing plans according to the identifiers. The billing plans are preferably filtered according to the context of the call to select the account or service provider relevant to the transaction. Thereafter, block 140 depicts establishing a secure channel with selected account/service providers for facilitating a billed transaction from the caller account provider to the device owner. The payment may be made to an account provider, service provider or as a micropayment to the device. Further, block 142 illustrates completing the record of the transaction with a payment number received from the caller account provider, and the process ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for billing for telephone usage, said method comprising:
   tracking, at a telephony device, usage of at least one measurable element of said telephony device itself by an identifiable individual, wherein said identifiable individual is distinct from an owner of said telephony device, wherein said usage of said measurable element is separate from any use of telephone service to said telephony device for a call;
   calculating, at said telephony device, a tariff for a cost of said amount of usage of said measurable element of said telephony device by said identifiable individual based on a cost per unit of actual usage of said measurable element specified by said owner of said telephony device; and
   transferring said tariff to bill a billing plan for said identifiable individual for said tracked usage of said measurable element of said telephony device from said telephony device via a telephone network to a billing service, wherein said billing service is enabled to facilitate transfer of an electronic payment between an account provider designated in said billing plan for said identifiable individual and an account for said owner of said telephony device, such that said owner of said telephony device is electronically compensated for usage of the actual telephony device by said identifiable individual.

2. The method for billing for telephone usage according to claim 1, wherein usage of at least one measurable element of said telephony device comprises at least one from among possession of said telephony device, battery usage of said telephony device, and address book access from said telephony device.

3. The method for billing for telephone usage according to claim 1, wherein said telephony device is a wireless telephone device.

4. The method for billing for telephone usage according to claim 1, wherein said telephony device is a wireline telephone device.

5. The method for billing for telephone usage according to claim 1, further comprising:
   alerting said identifiable individual, via said telephony device, to said cost per unit of actual usage specified by said owner of said telephony device for said tracked usage of said telephony device.

6. The method for billing for telephone usage according to claim 1, further comprising:
   detecting an authenticated identity of said identifiable individual;
   selecting a particular cost per unit of actual usage specified by said owner of said telephony device for said authenticated identity of said identifiable individual from among a plurality of separate costs per unit of actual usage specified by said owner for each of a plurality of separate authenticated identities; and
   calculating said tariff according to said particular cost per unit of actual usage specified for said authenticated identity of said identifiable individual.

7. The method for billing for telephone usage according to claim 1, wherein said identifiable individual is a caller.

8. The method for billing for telephone usage according to claim 1, wherein said identifiable individual is a callee.

9. A system for billing for telephone usage, said system comprising:
   a tracking controller within a telephony device;
   said tracking controller comprising:
   means for tracking usage of at least one measurable element of said telephony device itself by an identifiable individual, wherein said identifiable individual is distinct from an owner of said telephony device, wherein said usage of said measurable element is separate from any use of telephone service to said telephony device for a call;
   means for calculating a tariff for a cost of said amount of usage of said measurable element of said telephony device by said identifiable individual based on a cost per unit of actual usage of said measurable element specified by said owner of said telephony device; and
   means for transferring said tariff to bill a billing plan for said identifiable individual for said tracked usage of said measurable element of said telephony device from said telephony device via a telephone network to a billing service, wherein said billing service is enabled to facilitate transfer of an electronic payment between an account provider designated in said billing plan for said identifiable individual and an account for said owner of said telephony device, wherein said owner of said telephony device is electronically compensated for usage of the actual telephony device by said identifiable individual.

10. The system for billing for telephone usage according to claim 9, wherein usage of at least one measurable element of said telephony device comprises at least one from among possession of said telephony device, battery usage of said telephony device, and address book access from said telephony device.

11. The system for billing for telephone usage according to claim 9, wherein said telephony device is a wireless telephone device.

12. The system for billing for telephone usage according to claim 9, wherein said telephony device is a wireline telephone device.

13. The system for billing for telephone usage according to claim 9, further comprising:
   means for alerting said identifiable individual, via said telephony device, to said cost per unit of actual usage specified by said owner of said telephony device for said tracked usage of said telephony device.

14. The system for billing for telephone usage according to claim 9, further comprising:
means for detecting an authenticated identity of said identifiable individual;
means for selecting a particular cost per unit of actual usage specified by said owner of said telephony device for said authenticated identity of said identifiable individual from among a plurality of separate costs per unit of actual usage specified by said owner for each of a plurality of separate authenticated identities; and
means for calculating said tariff according to said particular cost per unit of actual usage specified for said authenticated identity of said identifiable individual.

15. The system for billing for telephone usage according to claim 9, wherein said identifiable individual is a caller.

16. The system for billing for telephone usage according to claim 9, wherein said identifiable individual is a callee.

17. A computer program product for billing for telephone usage, said computer program product comprising:
a recording medium;
means, recorded on said recording medium, for tracking usage of at least one measurable element of said telephony device itself by an identifiable individual at said telephony device, wherein said identifiable individual is distinct from an owner of said telephony device, wherein said usage of said measurable element is separate from any use of telephone service to said telephony device for a call;
means for calculating a tariff for a cost of said amount of usage of said measurable element of said telephony device by said identifiable individual based on a cost per unit of actual usage of said measurable element specified by said owner of said telephony device; and
means, recorded on said recording medium, for transferring said tariff to bill a billing plan for said identifiable individual for said tracked usage of said measurable element of said telephony device from said telephony device via a telephone network to a billing service, wherein said billing service is enabled to facilitate transfer of an electronic payment between an account provider designated in said billing plan for said identifiable individual and an account for said owner of said telephony device.

18. The computer program product for billing for telephone usage according to claim 17, further comprising:
means, recorded on said recording medium, for alerting said identifiable individual to said cost per unit of actual usage specified by said owner of said telephony device for said tracked usage of said telephony device.

19. The computer program product for billing for telephone usage according to claim 17, further comprising:
means, recorded on said recording medium, for detecting an authenticated identity of said identifiable individual; and
means, recorded on said recording medium, for selecting a particular cost per unit of actual usage specified by said owner of said telephony device for said authenticated identity of said identifiable individual from among a plurality of separate costs per unit of actual usage specified by said owner for each of a plurality of separate authenticated identities; and
means, recorded on said recording medium, for calculating said tariff according to said particular cost per unit of actual usage specified for said authenticated identity of said identifiable individual.

20. A method for billing a non-owner for telephone usage, said method comprising:
detecting, at a billing service operating outside a trusted telephone network via a secure channel established between a telephone service provider within said trusted telephone network and said billing service, a tariff calculated at a telephony device for usage by an identifiable individual of at least one measurable element of said telephony device communicatively connected with telephone service from said telephone service provider within said trusted telephone network, wherein said identifiable individual is different from an owner of said telephony device, wherein said usage of said measurable element is separate from any use of telephone service by said telephone service provider to said telephony device for a call; and
facilitating, through said billing service, transfer of an electronic payment for a cost designated in said tariff between a first account provider designated for said identifiable individual and a second account provider for said owner of said telephony device, such that said owner is compensated for usage of said telephony device.

21. The method for billing a non-owner for telephone usage according to claim 20, further comprising:
receiving, at said billing service with said tariff, voice authenticated identifiers for each of said identifiable individual and said owner of said telephony device; and
retrieving, based on said voice authenticated identifiers, account providers for each of said identifiable individual and said owner of said telephony device.

22. The method for billing a non-owner for telephone usage according to claim 21, retrieving account providers further comprising:
retrieving, based on said voice authenticated identifier for said owner, a billing plan for said owner comprising a plurality of providers each specified for handling a particular type of billing from among a plurality of types of billing accessible to said owner, wherein said second account provider is designated from among said plurality of providers for crediting tariff costs.

23. The method for billing a non-owner for telephone usage according to claim 21, retrieving account providers further comprising:
retrieving, based on said voice authenticated identifier for said identifiable individual, a billing plan for said identifiable individual comprising a plurality of providers each specified for handling a particular type of billing from among a plurality of types of billing accessible to said owner, wherein said first account provider is designated from among said plurality of providers for charging tariff costs.

24. The method for billing a non-owner for telephone usage according to claim 20, wherein said usage of said at least one measurable element of said telephony device occurs during a call originated from said telephony device.

25. The method for billing a non-owner for telephone usage according to claim 20, wherein said usage of said at least one measurable element of said telephony device occurs while said telephony device is in the possession of said identifiable individual.

26. The method for billing a non-owner for telephone usage according to claim 20, wherein facilitating, through said billing service, transfer of an electronic payment for a cost designated in said tariff further comprises:

establishing a secure channel between said first account provider and said second account provider for a billed transaction of said electronic payment.

27. A system for billing a non-owner for telephone usage, said system comprising:
  a billing service operating outside a trusted telephone network via a secure channel established between a telephone service provider within said trusted telephone network and said billing service;
  said billing service comprising:
  means for detecting a tariff calculated at a telephony device for usage by an identifiable individual of at least one measurable element of said telephony device communicatively connected with telephone service from said telephone service provider within said trusted telephone network, wherein said identifiable individual is different from an owner of said telephony device, wherein said usage of said measurable element is separate from any use of telephone service by said telephone service provider to said telephony device for a call; and
  means for facilitating transfer of an electronic payment for a cost designated in said tariff between a first account provider designated for said identifiable individual and a second account provider for said owner of said telephony device, wherein said owner is compensated for usage of said telephony device.

28. The system for billing a non-owner for telephone usage according to claim 27, said billing service further comprising:
  means for receiving, at said billing service with said tariff, voice authenticated identifiers for each of said identifiable individual and said owner of said telephony device; and
  means for retrieving, based on said voice authenticated identifiers, account providers for each of said identifiable individual and said owner of said telephony device.

29. The system for billing a non-owner for telephone usage according to claim 28, said means for retrieving account providers further comprising:
  means for retrieving, based on said voice authenticated identifier for said owner, a billing plan for said owner comprising a plurality of providers each specified for handling a particular type of billing from among a plurality of types of billing accessible to said owner, wherein said second account provider is designated from among said plurality of providers for crediting tariff costs.

30. The system for billing a non-owner for telephone usage according to claim 28, said means for retrieving account providers further comprising:
  means for retrieving, based on said voice authenticated identifier for said identifiable individual, a billing plan for said identifiable individual comprising a plurality of providers each specified for handling a particular type of billing from among a plurality of types of billing accessible to said owner, wherein said first account provider is designated from among said plurality of providers for charging tariff costs.

31. The system for billing a non-owner for telephone usage according to claim 27, wherein said usage of said at least one measurable element of said telephony device occurs during a call originated from said telephony device.

32. The system for billing a non-owner for telephone usage according to claim 27, wherein said usage of said at least one measurable element of said telephony device occurs while said telephony device is in the possession of said identifiable individual.

33. The system for billing a non-owner for telephone usage according to claim 27, wherein said means for facilitating transfer of an electronic payment for a cost designated in said tariff further comprises:
  means for establishing a secure channel between said first account provider and said second account provider for a billed transaction of said electronic payment.

34. A computer program product for billing a non-owner for telephone usage, said computer program product comprising:
  a recording medium;
  means, recorded on said recording medium, for detecting a tariff calculated at a telephony device for usage by an identifiable individual of at least one measurable element of said telephony device communicatively connected with telephone service from said telephone service provider within said trusted telephone network, wherein said identifiable individual is different from an owner of said telephony device, wherein said usage of said measurable element is separate from any use of telephone service by said telephone service provider to said telephony device for a call; and
  means, recorded on said recording medium, for facilitating transfer of an electronic payment for a cost designated in said tariff between a first account provider designated for said identifiable individual and a second account provider for said owner of said telephony device, for compensating said owner of said telephony device.

35. The computer program product for billing a non-owner for telephone usage according to claim 34, further comprising:
  means, recorded on said recording medium, for receiving with said tariff, voice authenticated identifiers for each of said identifiable individual and said owner of said telephony device; and
  means, recorded on said recording medium, for controlling retrieval, based on said voice authenticated identifiers, of account providers for each of said identifiable individual and said owner of said telephony device.

36. The computer program product for billing a non-owner for telephone usage according to claim 34, frirther comprising:
  means, recorded on said recording medium, for retrieving, based on said voice authenticated identifier for said owner, a billing plan for said owner comprising a plurality of providers each specified for handling a particular type of billing from among a plurality of types of billing accessible to said owner, wherein said second account provider is designated from among said plurality of providers for crediting tariff costs.

37. The computer program product for billing a non-owner for telephone usage according to claim 34, wherein facilitating transfer of an electronic payment for a cost designated in said tariff further comprises:
  means, recorded on said recording medium, for establishing a secure channel between said first account provider and said second account provider for a billed transaction of said electronic payment.

* * * * *